United States Patent [19]

Colter

[11] Patent Number: 5,350,992
[45] Date of Patent: Sep. 27, 1994

[54] MOTOR CONTROL CIRCUIT

[75] Inventor: Jeffrey B. Colter, Minneapolis, Minn.

[73] Assignee: Micro-Trak Systems, Inc., Mankato, Minn.

[21] Appl. No.: 761,328

[22] Filed: Sep. 17, 1991

[51] Int. Cl.$^5$ ............................................. H02P 5/40
[52] U.S. Cl. ................................... 318/807; 318/805; 318/810
[58] Field of Search ................. 363/96; 318/805, 806, 318/807, 798, 810, 802, 803, 808

[56] References Cited

U.S. PATENT DOCUMENTS

| | | | |
|---|---|---|---|
| 3,560,828 | 2/1971 | Kobayashi et al. | |
| 3,624,475 | 11/1971 | Smith . | |
| 3,846,694 | 11/1974 | Archer | 363/96 |
| 3,875,483 | 4/1975 | Farr . | |
| 3,967,173 | 6/1976 | Stich | 318/811 |
| 4,041,368 | 8/1977 | Gritter | 318/803 |
| 4,080,554 | 3/1978 | Nordby | 318/808 |
| 4,084,406 | 4/1978 | Brenneman | 361/22 |
| 4,259,620 | 3/1981 | Oates et al. | 318/802 |
| 4,259,845 | 4/1981 | Norbeck | 318/808 |
| 4,410,926 | 10/1983 | Hafner et al. . | |
| 4,491,778 | 1/1985 | Knox et al. | 318/803 |
| 4,651,077 | 3/1987 | Woyski | 318/785 |
| 4,689,543 | 8/1987 | Hocker | 318/806 |
| 4,694,228 | 9/1987 | Michaelis . | |
| 4,722,018 | 1/1988 | Pohl | 361/22 |
| 4,782,278 | 11/1988 | Bossi et al. | 318/785 |
| 4,786,850 | 11/1988 | Chmiel | 318/786 |
| 4,958,118 | 9/1990 | Pottebaum | 318/778 |

Primary Examiner—William M. Shoop, Jr.
Assistant Examiner—John W. Cabeca
Attorney, Agent, or Firm—Merchant, Gould, Smith, Edell, Welter & Schmidt

[57] ABSTRACT

Power from a DC power source, such as a 12 volt RV or boat battery, is boosted and converted to provide an AC signal suitable for operating an induction motor such as a refrigerator compressor motor. The converter provides voltage pulses having a substantially constant width. The converted voltage signal frequency is initiated at a low frequency and ramps up to 60 Hz. A start winding control circuit is provided for activating the start winding for a limited initial period. A thermostat for controlling the activation of the compressor motor is connected in series with the motor load such that shutting off the compressor disconnects the motor from the circuit. Control circuitry monitors under voltage, over voltage, overcurrent, AC switching, and adequate delay before restart and controls the circuitry accordingly.

21 Claims, 10 Drawing Sheets

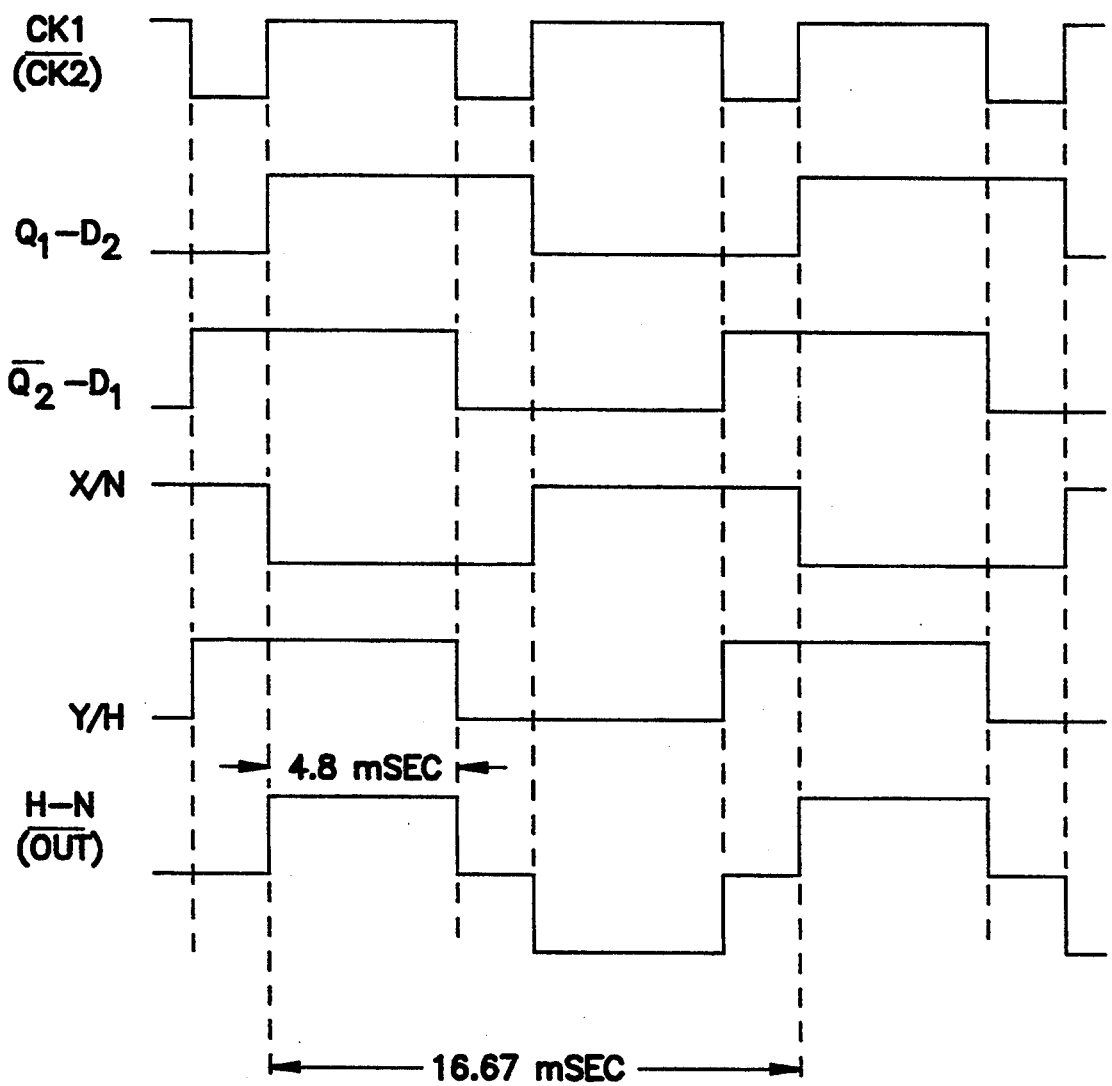

MOTOR CONTROL CIRCUIT

FIELD OF THE INVENTION

This invention relates generally to control circuitry for an induction motor, and more particularly to the starting and operation of a refrigerator compressor motor powered by a DC source as may be available in a recreational vehicle (RV) or boat.

BACKGROUND OF THE INVENTION

It is desirable to have effective circuitry for controlling the starting and operation of 120 V or 240 V AC induction motors with a DC power input. An application of such a circuit is the use of a 12 volt DC power source, as may be available with a car or RV, to operate a compressor motor for a refrigerator available in or around the vehicle. Traditional systems include peak voltage varying circuitry or pulse width modulation.

However, adapting the use of such a DC power source to control such a motor encounters certain requirements, limitations and problems with traditional systems. The circuit would preferably be adaptable for use with either a DC input or an AC input, as may be available through an RV hookup connected to a typical 60 Hz AC source. The circuit should provide substantially greater peak current when the motor is started. Circuitry should be provided so that the large initial current load does not create problems such as excessive current drain from the DC source or inadequate power which stalls the motor. It is also desirable to develop a starting and control circuit for such a motor which addresses the above problems and limitations through the use of relatively fewer circuit elements to increase the reliability, decrease the cost, and increase the ease of repair of the circuit. Other desirable factors of such an apparatus include higher efficiency, lighter weight, and operability in a wide range of ambient temperatures.

SUMMARY OF THE INVENTION

The present invention comprises a circuit controlling the power signal provided to an induction motor which may be powered by a DC source. One aspect of the invention includes means for generating an increasing or "ramp up" voltage signal to a voltage control oscillator (VCO), which generates a pulse signal which initially maintains a first, lower frequency, then ramps up to a higher frequency corresponding to the steady-state frequency desired for powering the motor. The output of the VCO is provided to further control circuitry which controls the output of an AC converter such that the AC converter provides a signal at the controlled frequency which has voltage pulses having a substantially constant peak voltage and a substantially constant pulse width. Also provided is a start winding activation circuit for providing power to a start winding for the induction motor for a selected period of time which is largely independent of the magnitude of the voltage signal provided to the circuit. An AC converter is controlled by logic circuitry to provide positive and negative voltage signals across the induction load, separated by substantially null voltages across the inductive load. The circuit also provides for the connection of a thermostat in series between the motor and the power source which not only provides for turning the motor on and off according to the temperature, but which also allows the thermostat to be wired and sensed on the same circuit as the motor.

DESCRIPTION OF THE DRAWINGS

FIG. 6 is a timing diagram relating to the control circuitry of the present invention.

DESCRIPTION OF THE PREFERRED EMBODIMENT

Figure 1:
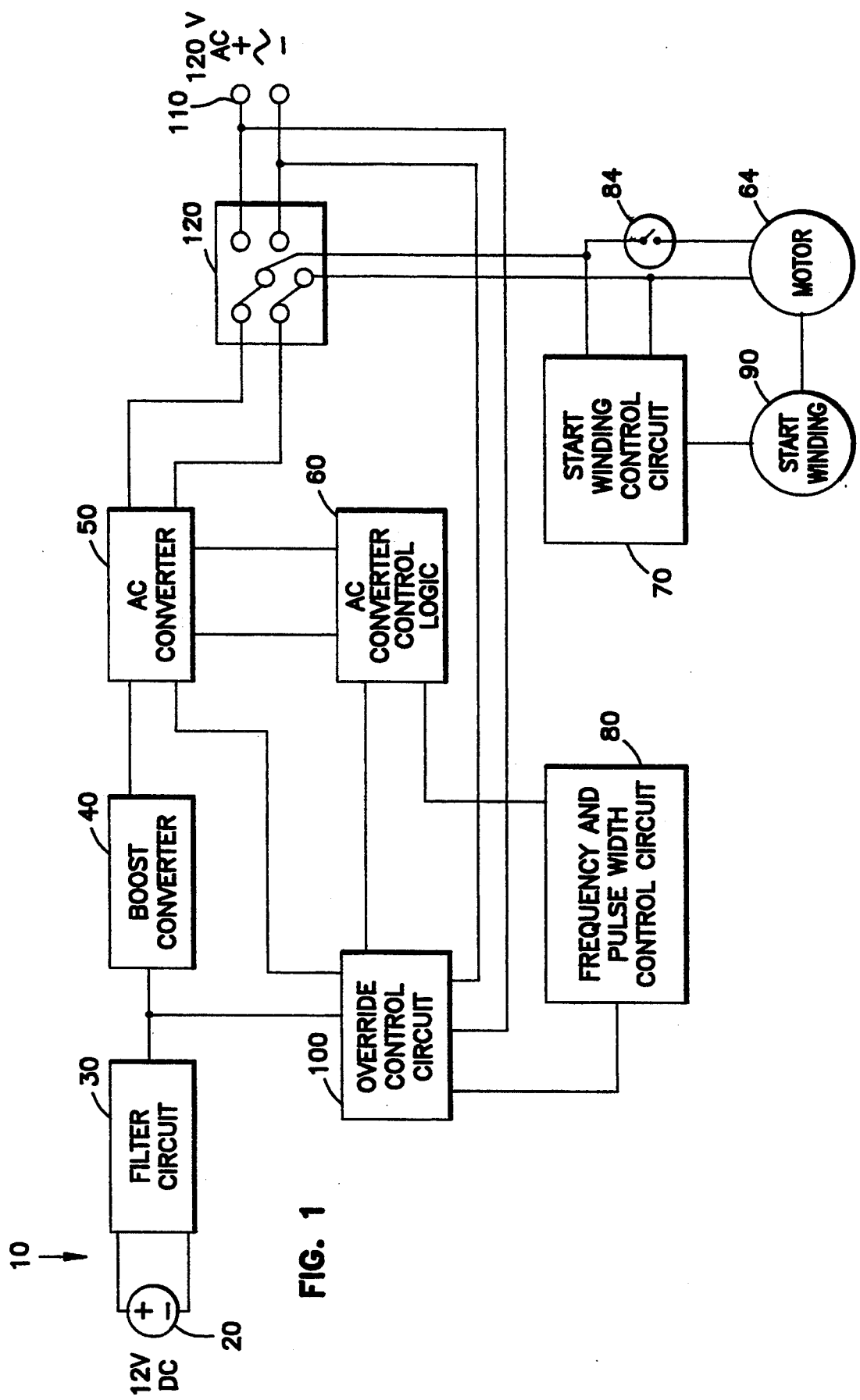
FIG. 1 is a block diagram showing the basic motor starting and control circuit of this invention.

Turning now to a detailed description of the preferred embodiment shown in the drawings, FIG. 1 is a block diagram representing the elements of an induction motor control circuit 10 in accordance with the present invention. A DC input source 20 is shown as a 12 volt DC source, which is the typical voltage of the DC source which will be available for an RV vehicle, for example. The DC source 20 is connected to a filter circuit 30 which filters out VHF signals as well as low-frequency interference generated by the DC-DC boost converter 40. The filtered DC signal is fed from filter 30 to boost converter 40. DC-DC boost converter 40 boosts the DC signal to a value of approximately 150 volts in the embodiment shown.

The output from DC-DC boost converter 40 is supplied to a quasi-square wave AC converter 50. AC converter feeds the boosted DC voltage signal through a series of switches in order to provide a periodic voltage signal to motor 64 and start winding control circuit 70. The converted signal is a quasi-square wave, comprised of positive and negative voltage pulses separated by periods of substantially null voltage. Such a periodic signal is suitable for driving a single phase induction motor such as the type typically used with refrigerator compressors, as described further below.

The pulse width of the voltage pulses supplied by AC converter 50 are controlled by AC converter control logic 60. The frequency of the quasi-square wave signal supplied by AC converter 50 is also controlled by AC converter control logic 60. AC converter control logic 60 is, in turn, controlled by the frequency and pulse width control circuit 80.

Frequency and pulse width control circuit 80 supplies appropriate control signals to AC converter control logic 60 such that AC converter 50 provides an output signal (such as the H (Hot)-N (Neutral) waveform shown in FIG. 6) having positive and negative voltage pulses of substantially constant pulse width. Frequency and pulse width control circuit 80 also provides control signals to AC converter control logic 60 such that a quasi-square wave AC signal is provided by AC converter 50 at the appropriate frequency during the starting and running phases.

Typically, the appropriate frequency of the AC converter output signal will be relatively low immediately after the circuit is activated, for example in the range of 10–20 Hertz. After maintaining the frequency of this modified AC signal at this low frequency for a predetermined time period, frequency and pulse width control circuit 80 provides control signals such that the frequency of the signal gradually increases or "ramps up" to the steady state frequency of the motor controlled circuit, typically 60 Hertz. FIG. 5 represents the control signals provided at 10 Hz and 60 Hz, respectively.

During the initial activation of the motor starting and control circuit, the modified AC signal is also supplied to start winding control circuit 70. This control circuit 70 provides power to start winding 90 for a preselected time period after thermostat 84 closes which is substantially independent of the input voltage to start the motor 64 and sufficiently short to avoid unnecessarily prolonging the additional power required for starting.

A thermostat 84 is provided for use of the circuit in its typical environment of powering a refrigerator compressor motor. The thermostat monitors the refrigerator temperature, if desired, to allow the motor to be shut off when the refrigerator falls below a desired temperature. A particularly advantageous integration of the control circuitry and the thermostat is described in more detail below.

Also shown in FIG. 1 is override control circuit 100. This circuitry represents a variety of features which interact with various other aspects of the overall circuitry to permit the activation and deactivation of the circuit in response to conditions such as input source under and over voltage, stalled motor, insufficient restart time, and thermostat sensing. These conditions include a lack of adequate voltage supplied from filter circuit 30 (representative, for example, of a low DC power supplying), excessive current required at boost converter 40 (representative, for example, of a stalled motor), and other features which are described in greater detail in connection with the detailed schematic circuit diagram.

FIG. 1 also shows leads 110 for an AC line voltage, which may be available to an RV vehicle parked next to an AC voltage hookup. It is generally desirable to allow the refrigerator compressor motor to be run by an AC supply if one is available, to avoid excessive load on the DC voltage source. FIG. 1 shows the AC input leads 110 connected to override control circuitry 100, to permit the circuit to automatically shut off the DC source-driven circuitry if the AC source is available. Also shown is an automatic relay 120 which permits switching between the AC and DC sources. Automatic relay transfer circuit 120 is provided to disengage the DC converter should conventional AC power become available.

To summarize the operation of the circuit:

Upon application of DC source power, and if the source voltage is between typically 9 and 18 volts, the override circuit 100 allows the DC-DC boost converter 40 to start. When the converter output voltage reaches a selected minimum, typically 155 volts, circuit 100 enables the AC converter 50. If control circuit 100 also senses that the thermostat is closed, the starting sequence of the motor begins by applying a selected low-frequency waveform, such as 10 Hz, to the motor for a predetermined time, typically about 400 ms. The frequency of the applied voltage is then increased to the motor up to a selected higher frequency, typically 60 Hz. When the thermostat opens, power is removed from the motor.

The DC gain of the voltage regulating feedback loop of the DC-DC converter 40 is set low such that when the thermostat opens the normal load presented by the motor is removed from the converter, and its output voltage rises. When this voltage reaches typically, 165 volts, the override circuit 100 shuts off the boost converter and AC converter, reducing source battery drain.

When a restart timer elapses, or the thermostat closes, whichever occurs last, the override circuit 100 starts the whole cycle again by enabling the converter 40. If the override circuit 100 senses the DC input voltage less than a selected voltage (typically about 9 volts) for longer than a selected time period (typically about 3 seconds), it disables the boost converter and AC converter whether they were operating or dormant. This condition indicates a discharged battery source. The override circuit 100 then will permit restarting only after the source voltage has risen to at least typically 12 volts indicating that a battery charger has been connected to the source. Also, if the override circuitry senses the source voltage greater than typically 18 volts, it will shut down the boost converter and AC converter instantaneously, starting the restart timer.

The circuit shown in FIG. 1 provides for controlling the frequency, peak voltage, and duty cycle of a modified AC signal to maintain a substantially constant voltage-to-frequency ratio. Such a signal provides a substantially constant magnetic flux in the motor 64. This prevents saturation of the motor iron core. Moreover, the circuit provides an initially-low frequency which ramps up to the steady-state frequency and provides a limited average voltage-per-unit-time to the motor during the starting phase, which is desirable to avoid excessive current drain from the DC power source without additional circuitry to control and adjust the DC voltage provided by the boost converter. These and other advantages will be further clarified with the detailed description of the schematic circuit diagram.

Figure 2:
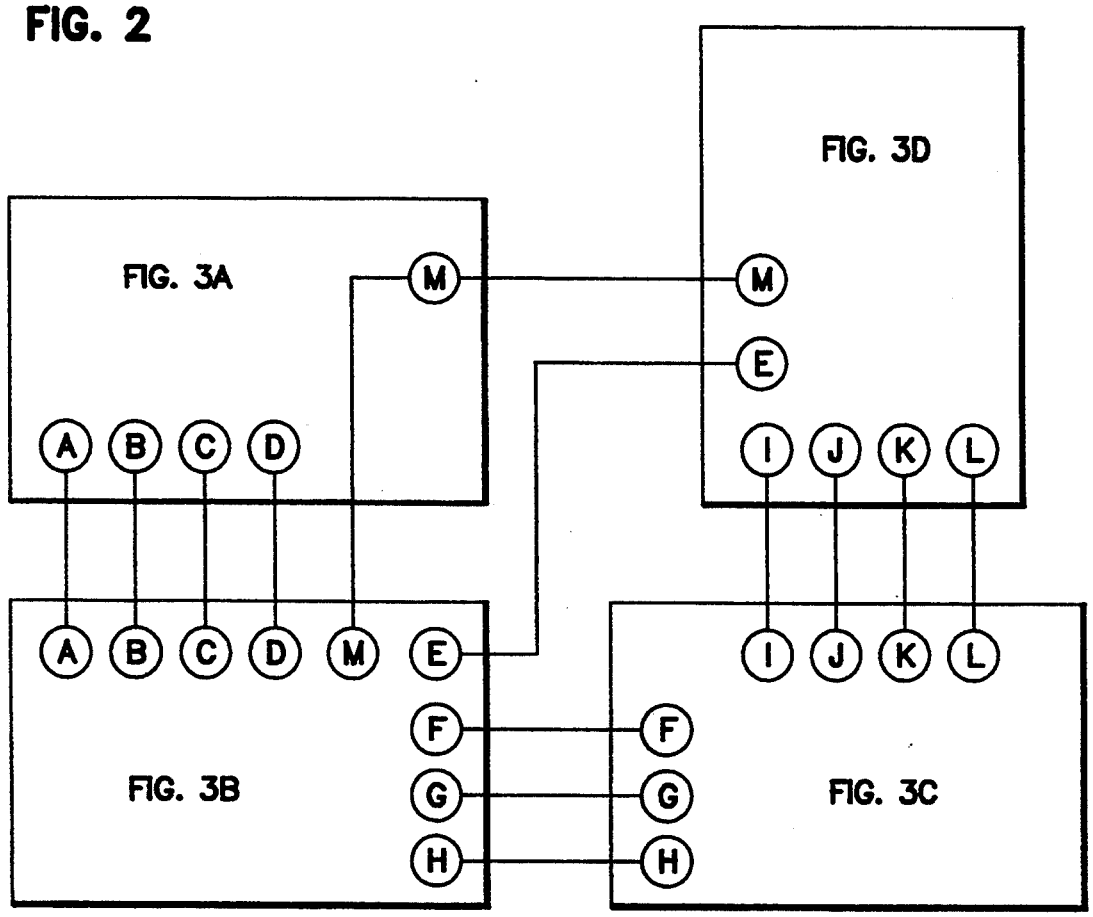
FIG. 2 is a block diagram showing the interrelationship between the sections of the circuitry shown in the sections of FIG. 3.

FIG. 2 shows the interrelationship between the detailed schematic circuit diagrams, FIGS. 3A, 3B, 3C, and 3D.

Figure 3A:
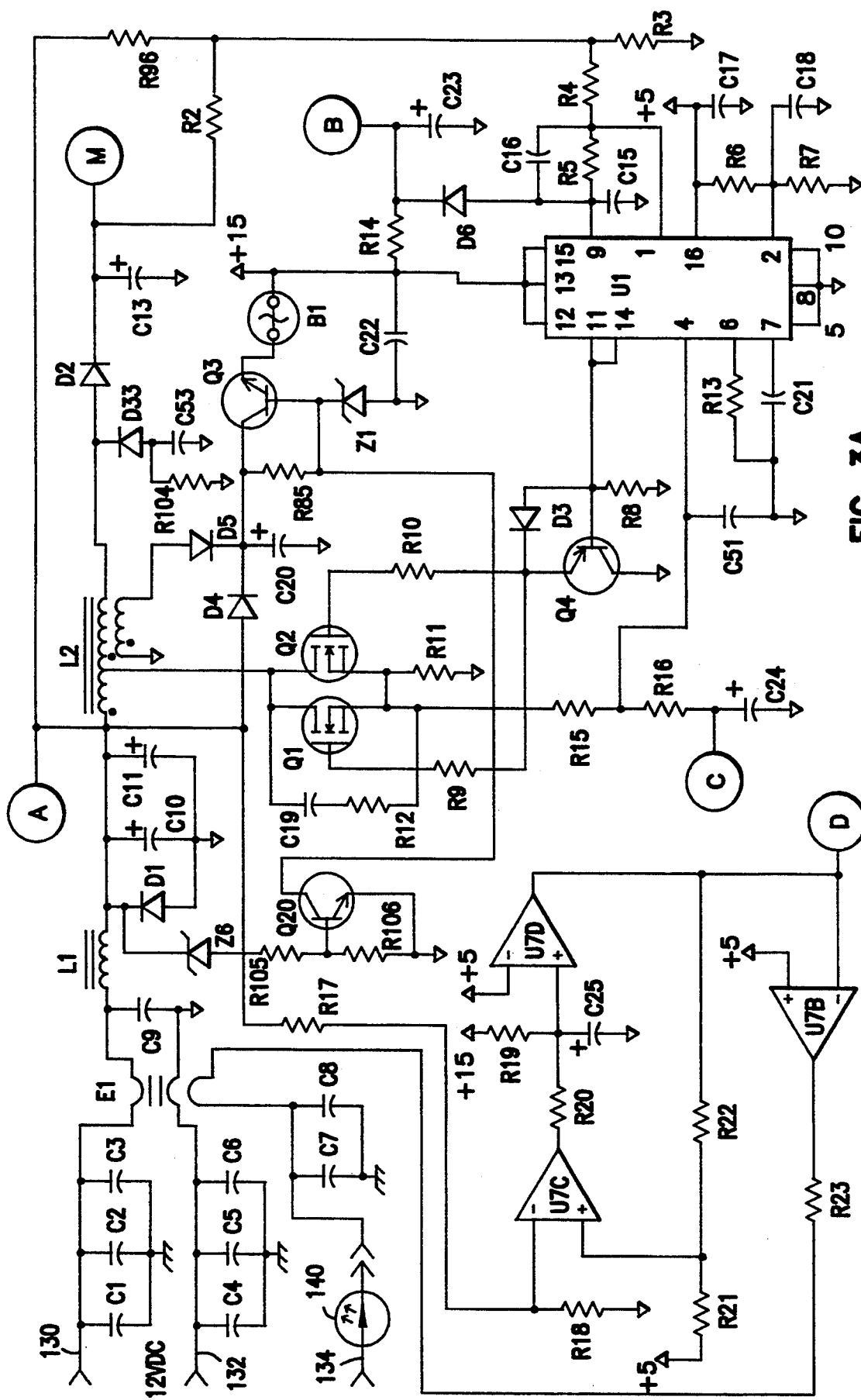
FIGS. 3A, 3B, 3C, and 3D are sections of a schematic circuit diagram of the motor starting and control circuit in accordance with the invention.

Turning now to FIG. 3A, a motor control circuit in accordance with the present invention includes DC input leads 130, 132. A DC signal input is fed to filter circuitry (30 in FIG. 1) through leads 130 and 132. Filtering capacitors C1 through C8 and ferrite bead E1 reduce interference generated by the DC-DC converter 40. The differential mode filter comprised by inductor L1 and capacitor C9 protects electronic systems such as engine computers and anti-lock brake systems from interference generated by converter 40.

A 12 volt DC signal is also provided at power input 134 to light emitting diode 140 to indicate that the low battery circuit is activated.

The filtered DC signal provided at inductor L1 is connected across diode D1, which protects the circuitry from a reversed polarity DC voltage source. Capacitors C10 and C11 provide further filtering of the DC voltage signal provided to the boost converter circuit.

The DC-DC converter circuitry (40 in FIG. 1) will now be described. The filtered DC signal provided across capacitors C10 and C11 is fed to a tapped inductor L2. The tapped inductor provides current through diode D2 capacitor C13. Diode D2 is protected from excess voltage stress by diode D33, capacitor C53, and resistor R104. C13 is a relatively large capacitor which receives current through inductor L2 and diode D2 which steps up the DC voltage from the 12 volt DC source received at leads 130, 132 to a voltage in the range of 150–165 volts DC.

Regulator U1 controls the converter circuitry and provides switching pulses to FET transistors Q1 and Q2. U1 regulates the width of the pulses provided to FETs Q1 and Q2 in accordance with the extent to which capacitor C13 requires a higher voltage potential. In the embodiment described, the pulse provided by U1 is lengthened if the voltage across capacitor C13 falls below 150 volts. The regulator IC compares the converter DC output voltage via a feedback comprised of R2, R3, R4, R5, C15, and C16, and the converter DC input voltage via a feedforward loop comprised of R96 with a DC reference voltage to control the pulse width of conduction of the main switching transistors, Q1 and Q2. This action regulates the amount of energy stored in the main inductor, L2, during the first half of the cycle and hence the amount of energy released by L2 to the load during the second half of the cycle. The switching frequency is maintained at a constant frequency, for example, 25 KHz by R13 and C21.

C13 is charged up by the discharging action of L2 to a regulated voltage of typically 150 volts. An auxiliary winding on L2 provides a quasi-regulated voltage to a regulator comprised of C20 and Q3 which in turn provides a substantially constant voltage supply for the control and logic circuits. Input DC source current limiting is provided by shunt resistor R11 through filter R15 and C51 to regulator U1 at pin 4. Converter enabling by the override circuit U2B is provided through D6. Soft start is provided by R14 and C23.

As shown in FIG. 3A, comparators U7C and U7D provide DC source undervoltage sensing, typically a DC input below 9 volts. Overvoltage sensing and regulation is provided by zener diode Z6, resistors R105 and R106, and transistor Q20. The undervoltage circuit senses the voltage provided to inductor L2 at point A. The sensed voltage is fed through voltage divider circuit R17, R18 to voltage comparator U7C. U7C is set such that if the voltage provided to inductor L2 falls below a predetermined level, the U7C output is switched to a high state. To ensure that the circuit does not determine that the voltage supplied to inductor L2 is low immediately after the circuit is activated, since it is expected that the voltage at L2 would be low at least momentarily, the output of comparator U7C is provided with a delay RC circuit comprised of resistor R19 and capacitor C25. The U7C output is fed to comparator U7D, which is triggered if the high output of U7C is maintained for longer than the R19-C25 time constant. U7D provides a high signal which modifies the DC source sense voltage, typically to 12 volts and ensuring adequate source battery charging before restarting is allowed. The U7D signal controls comparator U7B, which controls low-battery indicating LED 140.

Figure 3B:
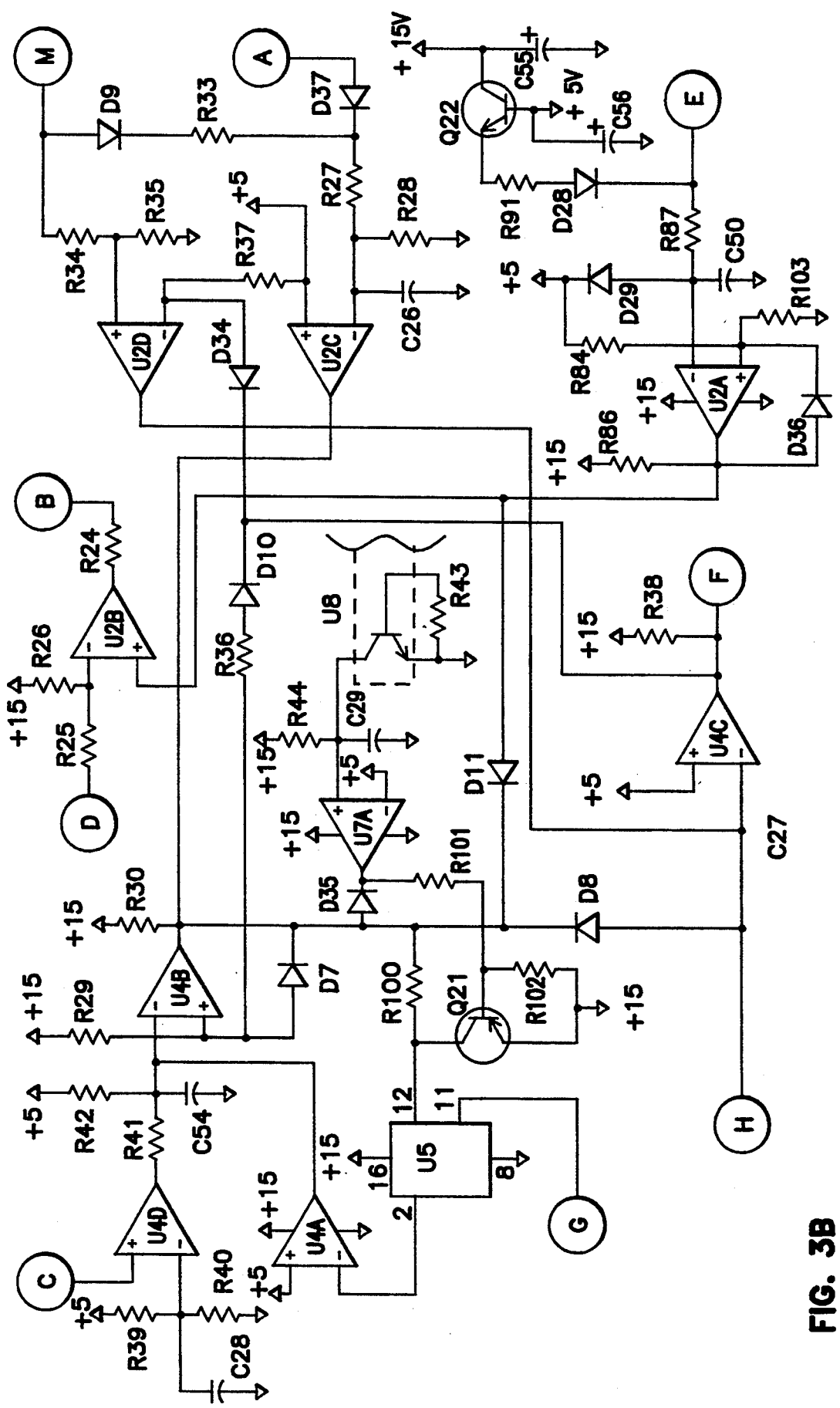

The output of comparator U7D is also supplied to comparator U2B, shown in FIG. 3B. Feeding a high signal to the negative input of comparator U2B causes the output of comparator U2B to go low, providing a low signal through resistor R24 to the boost converter circuit and turning that circuit off. The circuit will then wait to reactivate the converter circuit until an adequate voltage input is provided to inductor L2.

FIG. 3B shows additional circuitry corresponding to the override control circuitry 100 in FIG. 1. For example, the input to inductor L2 in FIG. 3A is connected through the line designated A to line A in FIG. 3B. This voltage across capacitor C11 is fed through diode D37 and voltage divider circuit R27, R28 which also acts in conjunction with capacitor C26 to provide a delayed indication of the input voltage to the negative input of comparator U2C. Hence U2C senses battery overvoltage levels (typically over 18 volts).

Comparator U2C also acts as an excess output voltage detector. The boosted DC voltage signal provided at capacitor C13 (FIG. 3A) is fed to the negative input of comparator U2C through diode D9, resistors R33, R27 and R28, and capacitor C26. In the preferred embodiment, the value selected for the circuit elements feeding the negative input of comparator U2C are selected such that a voltage across capacitor C13 in excess of 165 volts will cause the output of comparator U2C to go low. Switching the output of comparator U2C to a low state causes the output of the latch circuit comprised of comparator U4B, diode D7, resistor R29, and resistor R30 to go low. The U4B latch is also set by excessive source current sensed by comparator U4D, excessive source voltage sensed by comparator U2C, and rising converter DC output voltage (such as when thermostat 84 opens), also sensed by U2C. The lowering of the output of comparator U4B switches comparator U4C isolated by diode D8. Resistors R41, R42 and capacitor C54 filter high-frequency pulses from the output of U4D. The output of comparator U4C is fed through line F to the Dual D flip-flop U3, shown in FIG. 3C. Providing a low signal to the negative input of comparator U4C disables the Dual D flip-flop U3 which controls the AC converter (50 in FIG. 1).

The switching of the output of comparator U2C to a low signal also results in turning on transistor Q5 (FIG. 3C) through voltage dividing resistors R31 and R32. Activating transistor Q5 resets the frequency and pulse width control circuitry, discussed in greater detail below.

The boosted DC voltage provided at capacitor C13 is also fed through voltage dividing resistors R34 and R35 to the positive input of comparator U2D. The values of these resistors are selected such that a DC voltage at capacitor C13 in excess of a predetermined voltage, such as 155 volts, will create a positive output from comparator U2D. Such an output increases the input to the negative terminal of comparator U4C, which switches the output of comparator U4C to a low state. The high output from comparator U2D also causes transistor Q5 (shown in FIG. 3C) to turn off. These changes result in activation of the frequency and pulse width control circuit (80 in FIG. 1) and the AC converter control logic (60 in FIG. 1), and thus allow the motor starting and controlling circuit to begin supplying power to the induction motor.

FIG. 3B also provides overcurrent detection through comparator U4D. The voltage divider circuit R39, R40, in tandem with capacitor C28, normally maintains the output of comparator U4D in a low state. The positive input of comparator U4D is connected to the boost converter circuit between capacitors C24 and R16 (shown in FIG. 3A). Current drawn for an excessive period of time through the boost converter circuit, which may for example be caused by a stall in the induction motor, causes the output of comparator U4D to switch high. The output of comparator U4D is provided through a voltage divider comprised of R41 and R42 to the negative input of latch comparator U4B. The high input to comparator U4B (which latches) causes the frequency and pulse width control circuit and AC converter control logic to be switched off in a manner similar to the manner in which those elements are switched off when the output of comparator U2C goes low due to excess voltage, as discussed above.

Figure 3C:
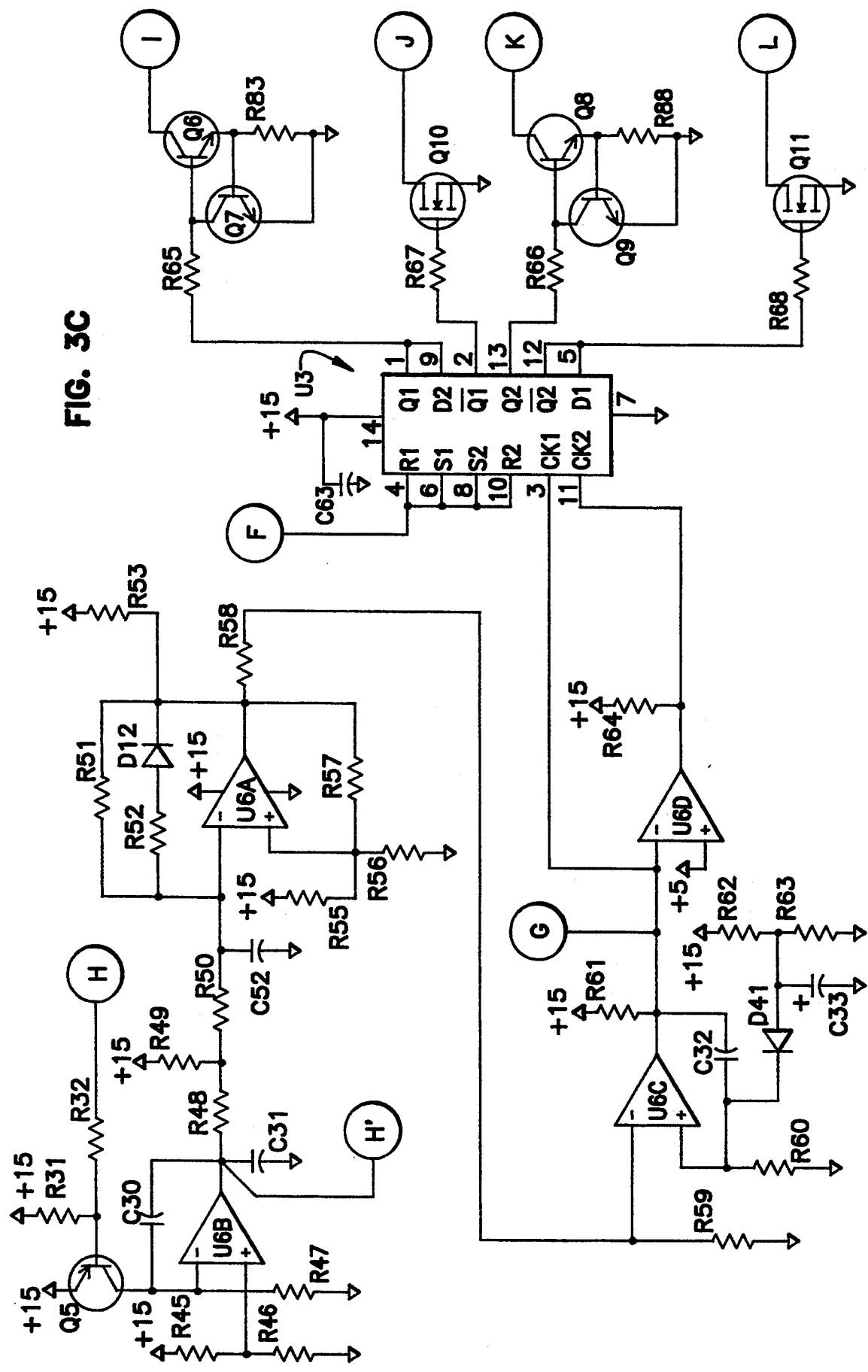

Timer U5 is connected through a line designated G to the pulse generating circuit shown in FIG. 3C. Timer U5 pulses generated by the frequency and pulse width control circuit to preclude the motor starting and control circuit from reactivating within an excessively short period. Allowing the circuit to be turned on again too soon after the circuit has been deactivated may overload the control circuitry and compressor motor and shorten the life of the circuit and elements. Once a low signal is provided by latch comparator U4B, and if AC line voltage is not present, timer U5 is activated such that the selected time period (for example, approximately three to four minutes) will be counted. Meanwhile, timer U5 maintains comparator U4A in a high position to ensure that the latch comparator (U4B) is not reset too soon. Once the selected time period expires, timer U5 provides a signal to comparator U4A which inverts the output of comparator U4A, resetting comparator latch U4B. This delay allows gas pressure in the refrigerant compressor to subside and reduces the starting load on the motor reducing the likelihood of a stall. Timer U5 also delays restarting in the event of a stall, wherein excess is sensed.

Another element of the override control circuitry (100 in FIG. 1) in a system having both AC and DC input capability is circuitry indicating the availability of AC line voltage. FIG. 3B shows a portion of opto-coupler U8, which receives a signal from circuit elements shown in FIG. 3D which indicate the availability of an AC line voltage (typically 120 volts AC) as may be available at an RV hookup. Receipt of an AC-available signal at opto-coupler U8 causes the positive input to comparator U7A to fall. This causes the output of comparator U7A to go low, which sets the latch U4B low, which in turn disables the converter 40, AC converter 50, and the frequency and pulse width control circuit 80. Also, the timer U5 is reset via R101 and Q21.

When AC line power disappears, the U7A output goes high, starting the timer U5. After the preselected 3½ minute delay, the latch U4B is reset, starting the DC converter 40, and subsequently the AC converter 50.

FIG. 3C shows the frequency and pulse width control circuitry (80 in FIG. 1) in greater detail. As discussed elsewhere, the activation and deactivation of transistor Q5 is controlled at a number of points elsewhere in the circuitry. When Q5 is activated, the frequency and pulse width control circuitry is deactivated. When transistor Q5 turns off, for example when the AC converter 50 is enabled, the control circuitry is activated as described below.

Comparator U6B is configured as an integrator which generates a linear voltage ramp output. The negative input to comparator U6B is controlled by transistor Q5. The integrator time constant is controlled by capacitors C30 and resistor R47. When Q5 is on, the negative input to comparator U6B is high, causing the output of comparator U6B to maintain a low state. Deactivation of transistor Q5 causes the negative input to comparator U6B to decrease. This results in a gradual, linear increase in the output voltage from comparator U6B. However, the voltage provided by comparator U6B does not increase until a period of approximately 400 milliseconds after the activation motor control and starting circuit as determined by the voltage divider R45 and R46. This delay in activation of this element of the frequency and pulse width control circuit coincides with the activation time of the start winding. After this delay, U6B output rises linearly from 0 to 15 volts in approximately 1 second.

Comparator U6A is a voltage controlled oscillator (VCO) which provides relatively short pulse widths at a first, lower frequency (typically 20 Hz) corresponding to the first, lower voltage output from comparator U6B when the circuit is initially started. In the preferred embodiment, this frequency is selected such that the frequency provided by the AC converter circuit is approximately 10 Hertz. The frequency of the signal provided by VCO U6A maintains this first, lower frequency for approximately 400 milliseconds, corresponding to the approximate period during which the start winding (discussed below) is engaged.

Figure 5A:
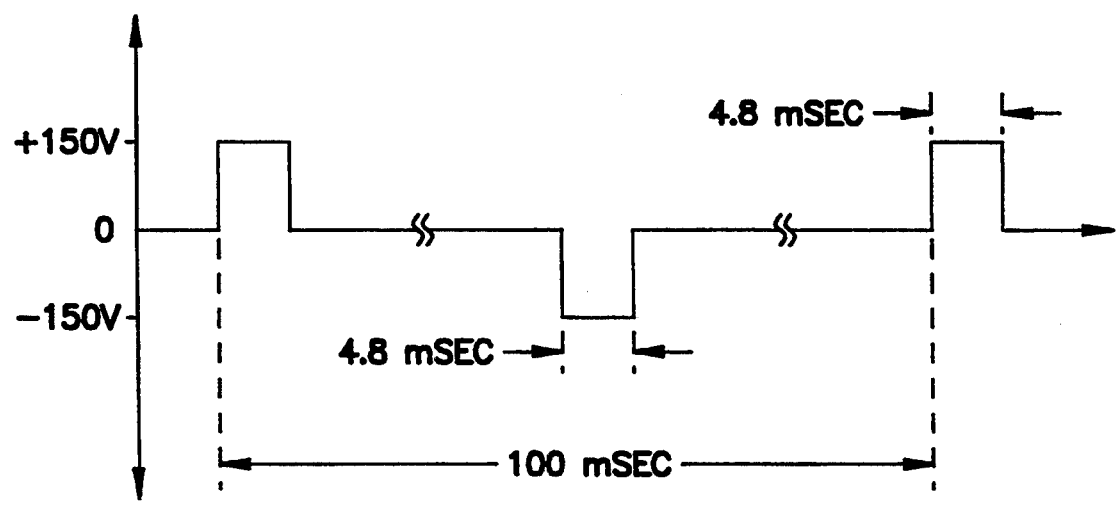
FIGS. 5A and 5B are waveform diagrams representing the voltage supplied to the motor at 10 Hz and 60 Hz.
Figure 5B:
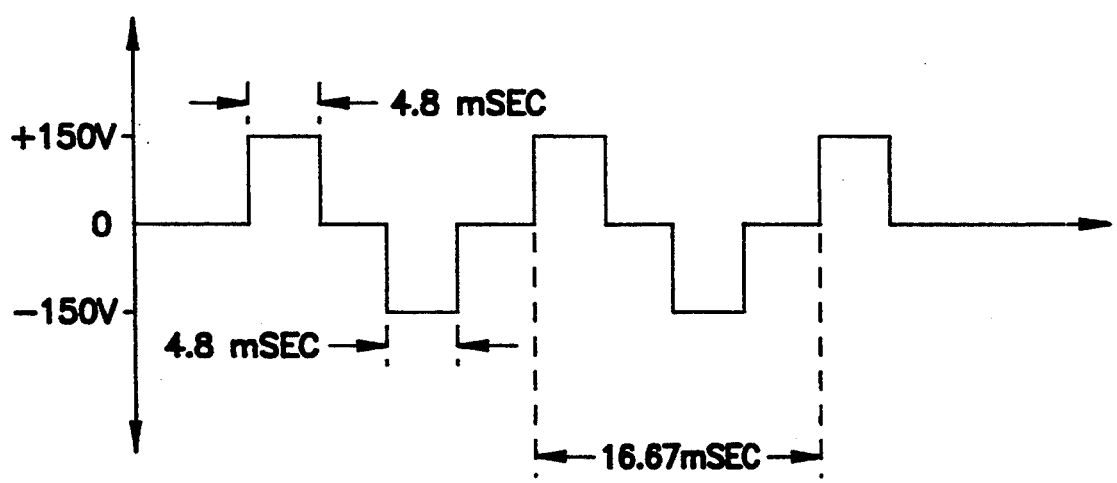

As the voltage input to VCO U6A increases to its steady state, higher voltage level of approximately 15 volts, the frequency of the signal generated by the VCO gradually increases to a steady state level (typically 120 Hz). The steady state frequency of the output of VCO/U6A corresponds to a frequency for the converted signal provided by the AC converter of approximately 60 Hertz. FIGS. 5A and 5B show the desired output signals of AC converter 50 generated for 10 Hz and 60 Hz, respectively.

The narrow-square wave pulses generated by VCO U6A are provided through voltage dividing resistors R58 and R59 to the negative input of one-shot multivibrator U6C. Elements R60, C32, R61, D41, C33, R62, and R63 are selected such that the receipt of a relatively short pulse from VCO U6A triggers an output signal from one shot multivibrator U6C of a substantially constant pulse width and at a frequency (and duty cycle) which varies linearly with the voltage output from integrator U6B. In the preferred embodiment described herein, the pulse width is selected to be 4.8 milliseconds. The average volts per Hz is thus kept substantially constant.

The signal provided by one-shot multivibrator U6C thus has a substantially constant, predetermined pulse width and a frequency controlled in a selected manner by integrator U6B and VCO U6A. This frequency and pulse width control signal is provided to inverter U6D. The input to the negative terminal of inverter U6D is fed directly to input CK1 of Dual D flip-flop U3. The output of inverter U6D, corresponding to the inverted signal provided to input terminal CK1 of element U3, is fed to a second clock input, CK2 of Dual D flip-flop U3. These controlled-pulse width and controlled-frequency clock inputs result in the generation of two synchronized square waves (see FIG. 6) having a frequency equal to half the clock input signal frequency that are phase displaced by an amount of time equal to the controlled pulse width provided by the pulse width control circuit 80, such that the conduction time of the AC converter, and hence the width of output voltage pulses of either polarity, have the same value. The average voltage provided to motor 64 is controlled in part by the pulse width.

Inputs 4, 6, 8, and 10 of Dual D flip-flop U3 receive the output of comparator U4C, discussed in connection with FIG. 3B. These inputs are effectively the enable/disable ports of Dual D flip-flop U3, and determine whether element U3 provides control signals to the AC converter circuit.

When the flip-flop U3 is enabled, outputs to the AC converter circuit elements are provided to transistors Q6 and Q7 through resistor R65. A separate output is provided to transistors Q8 and Q9 through resistor R66. FET Q10 is provided an output from a separate port of element U3 through resistor R67. FET Q11 is fed through a separate port of flip-flop U3 through resistor R68.

The transistors Q10 and Q11 provide means for stepping up the low current outputs of the logic signals provided by flip-flop U3 to the current levels required for controlling the circuit elements of the AC converter.

Figure 3D:
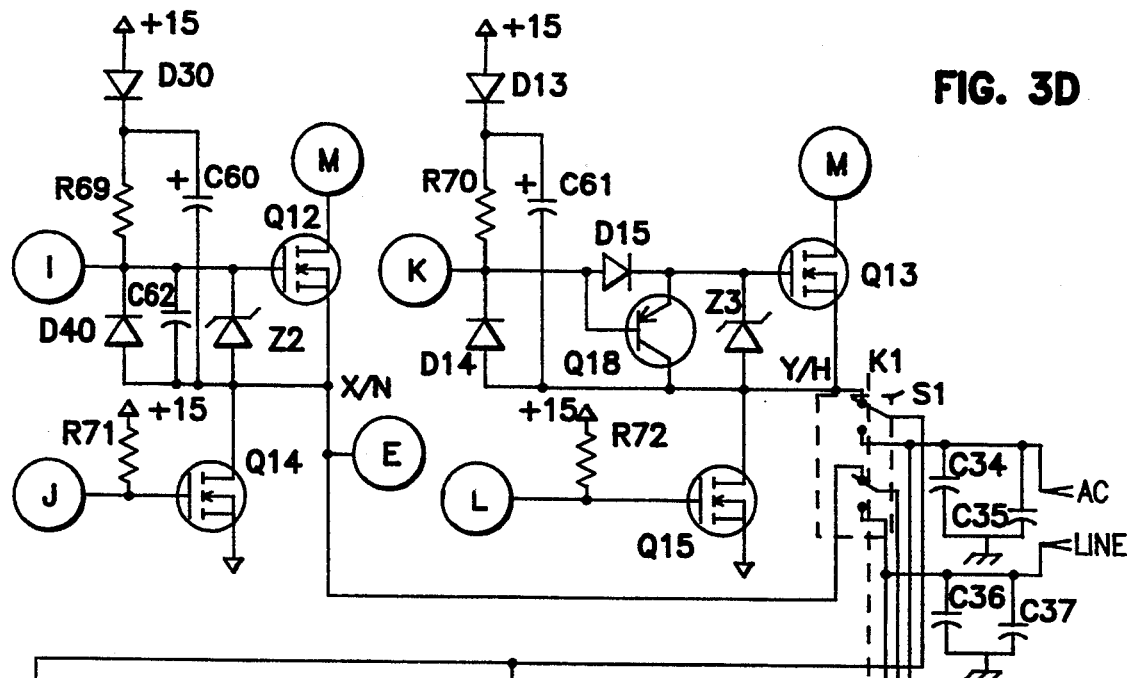
Figure 3D:
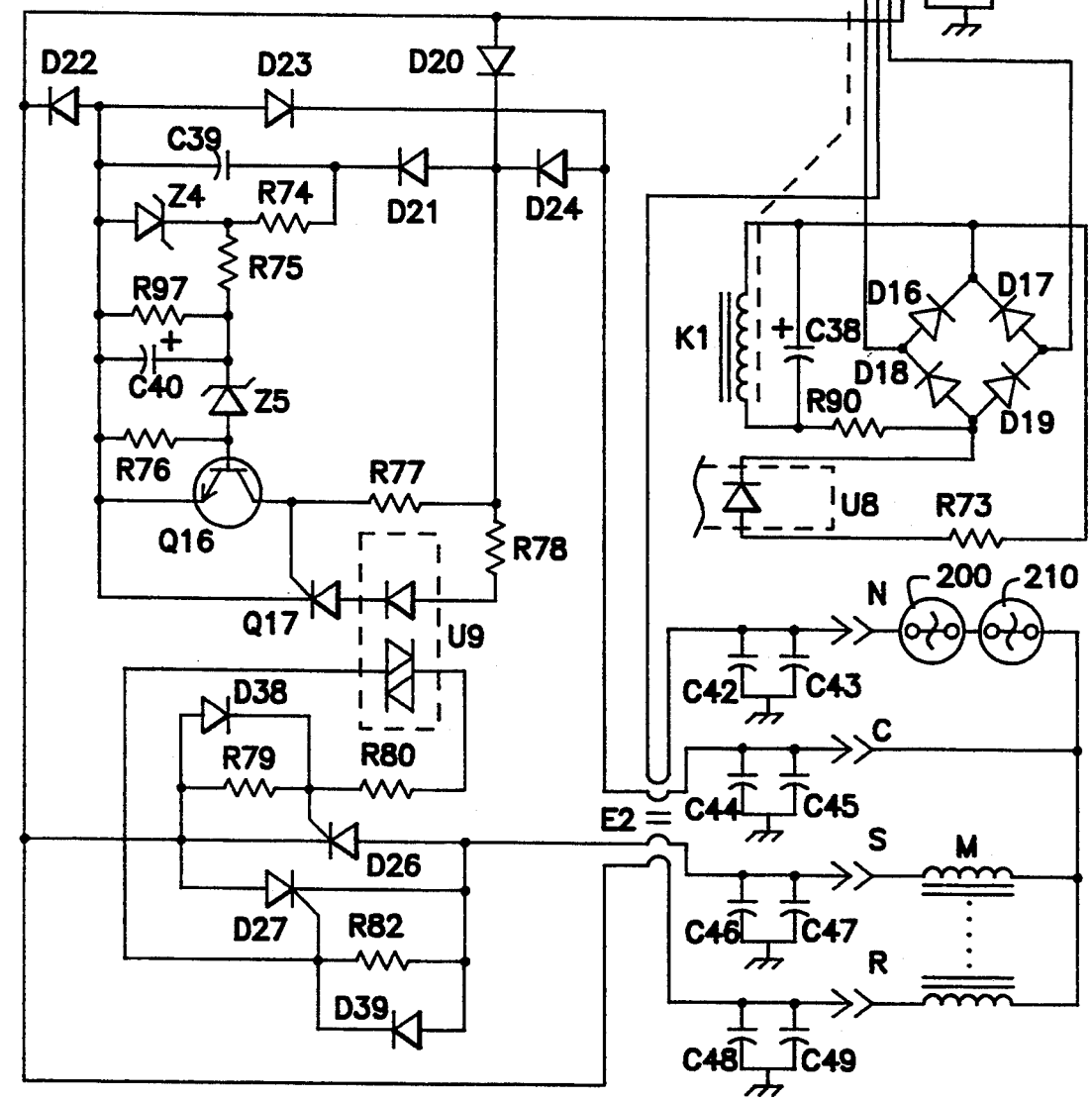

FIG. 3D shows the elements of the AC converter circuit 50 connected along lines I, J, K, and L to the circuitry shown in FIG. 3C.

FET Q12, Q13, Q14, and Q15 effectively act as an bridge circuit switch to provide the positive, negative, and substantially null voltage signals comprising a quasi-square wave AC voltage to the motor load at the preselected frequency and pulse width. The waveform provided corresponds to the H-N signal shown in FIG. 6. One end of the motor load is connected to point X corresponding to the point at which transistors Q12 and Q14 are connected. The other end of the motor load is connected to the point indicated as Y and corresponding to the point at which transistors Q13 and Q15 are connected. The boosted DC signal is provided to transistors Q12 and Q13 through line M, also shown in FIG. 3A. The source ends of FETs Q14 and Q15 are connected to the circuit common.

The switching sequence can be described in four states comprising one complete AC cycle. In one state, Q13 and Q14 conduct current through the motor load connections at X and Y to provide a positive voltage measured at Y(H) with respect to X(N). In state two, the first off time, Q15 turns on and Q13 turns off, and the current circulates to provide a substantially null voltage across the motor load. In state three the polarity is reversed, and Q12 and Q15 are conducting current to provide a negative voltage across the motor load. In state four, the second off time, the current circulates as shown through Q12 and Q13 to provide a substantially null voltage across the motor load. This mode of switching whereby motor inductive current is recirculated during the off time by applying substantially zero voltage, i.e. a short circuit across the motor, reduces motor harmonic losses. The conventional switching sequence turns all switches off during the off time resulting in inductive flyback voltages which cause additional iron core losses due to hysteresis and eddy current effects, resulting in substantially lower efficiency. The combination of 150 volts peak and 4.8 msec positive and negative pulse widths, comprising approximately 58% of the full cycle, increases the motor efficiency.

A preferred method of providing a null voltage signal to the induction load across lines X and Y is as follows. The logic signals generated from Dual D flip-flop U3 are provided such that transistors Q12 and Q13 are set in an active state and transistors Q14 and Q15 are set in an inactive state. Such settings result in a voltage potential across the induction load substantially close to zero, eliminating the feedback current from the induction load to the AC converter circuit. A similar beneficial result may be obtained if logic signals provided from flip-flop U3 are such that transistors Q14 and Q15 are set in an active state, and transistors Q12 and Q13 are set in an inactive state.

From the above discussion, it can be seen that an example of the inputs provided through U3 logic control outputs 1, 2, 13, 12 corresponding to V high, V null, V low, and a second V null are as shown in Table 1. The logic output settings correspond to the signals generated by the Dual D flip-flop as controlled by the two inverted clock signals provided by comparator U6D to flip-flop U3. Gate enhancement for Q12 is provided by a flying capacitor drive circuit comprised of D30, R69, C60, D40 and Z2. Q13 is driven in a similar fashion. In addition, Q12 and Q13 are controlled by Q6 and Q8 (FIG. 3C), respectively. These two transistors are configured as current sources to facilitate level translation between logic level signals generated by U3 and the much higher voltages of the AC converter, and also to facilitate the sensing of the thermostat by U2A in the override circuit, as described below.

TABLE 1

| LOGIC SIGNAL IN (U3 PIN NOS.) | | | | AC CONV. VOLTAGE OUT (H-N) |
|---|---|---|---|---|
| 1 | 2 | 13 | 12 | (Y-X) |
| 1 | 0 | 0 | 1 | +150 V |
| 1 | 0 | 1 | 0 | 0 V |
| 0 | 1 | 1 | 0 | −150 V |
| 0 | 1 | 0 | 1 | 0 V |

The alternative AC input is shown at 110, filtered by capacitors C34, C35, C36, and C37. A relay K1 is shown for converting between use of an AC input or DC input.

Even if the AC input is not connected to the motor load through relay K1, the AC input leads 110 are continuously connected to the rectifying circuit comprised of diodes D16, D17, D18, and D19, capacitor C38, K1 relay coil and resistors R90 and R73. This rectified circuit is provided to opto-coupler U8, which activates comparator U7A as shown in FIG. 3B. This circuitry provides for switching the power input to the induction motor to the AC supply if AC line voltage is available.

FIG. 3D also shows the circuit elements comprising the start winding control circuit (70 in FIG. 1). The circuit is activated either with the AC converter output voltage or AC line voltage if available.

A feature of the start winding control circuit is the incorporation of a time delay during which the start winding is activated for a time sufficient to start the motor but not substantially longer, the timing being set by control circuitry to be substantially independent of the voltage potential supplied to the circuit. The time period approximates the delay period before U6B ramps up the signal frequency, and is typically about 400 ms.

D20, D22, D23, and D24 form a full wave bridge rectifier charging C39 through isolation diode D2 from AC converter output voltage or AC line voltage, when present. Capacitor C39 serves to hold the charge provided by the incoming voltage above the breakdown voltage level zener diode Z4, thus maintaining the voltage across zener diode Z4 at a substantially constant level, even at the lowest voltage and lowest frequency.

An electrically isolated triac U9 provides the control signal from the start winding control circuit to the start winding. The opto-coupler U9 provides a start winding activation signal when current is provided. Current is provided through this circuit when SCR Q17 is in an on state, with current supplied through resistor R78. The incoming rectified AC line or AC converter voltage is supplied through R77 to the gate of Q17, maintaining the triac U9 in an "on" state when current is initially supplied.

After a voltage potential difference is developed across zener diode Z4, the time delay circuit provide by resistor R75 and capacitor C40 results in the delayed increase in the voltage potential difference developed across zener diode Z5, which limits the time during which the start winding is engaged. Resistor R97 provides a discharge path for capacitor C40. Resistor R75 and capacitor C40 have values selected in conjunction with zener diodes Z4 and Z5 and resistor R76 so that the base of transistor Q15 is provided with an activating voltage after a selected period of time substantially independent of voltage provided by the incoming AC line or AC converter circuit. When the voltage across capacitor C40 reaches 5.7 volts, zener diode Z5 conducts, turning on transistor Q16. When Q16 is activated, SCR Q17 is turned off and the start winding control signal supplied through opto-coupler U9 is deactivate. This deactivates the start winding by removing gate firing pulses from SCRs D26 and D27. The amount of time during which the start winding activation voltage is supplied is in the range of 400 milliseconds.

The incoming AC line or AC converter voltage is provided across the start winding S via the hot connection (point Y) and the neutral connection (point X) as controlled by SCRs D26 and D27. Circuitry comprising resistors R79 R80, and R82 with SCRs D26 and D27, controlled by triac opto-coupler U9, provides bidirectional current flow through the start winding while the opto-coupler is activated. U9 receives current pulses every half cycle of applied voltage through resistor R78, triggering SCRs D26 and D27, depending on voltage polarity.

FIG. 3D also shows the single-phase motor M, typically a compressor motor for a refrigerator. The windings of motor M are supplied by the neutral, common, start, and run lines, N, C, S, R, respectively. Each of these lines has supplied across their inputs filtering capacitor pairs. Capacitors C42 and C43 are connected across the neutral line, capacitors C44 and C45 are connected across the common line, capacitors C46 and C47 are connected across the start winding, and capacitors C48 and C49 are connected across the run or main winding. The neutral line of the motor is also protected by a circuit breaker 200.

The motor is also connected in series and directly to a thermostat 210. The operation of the thermostat circuitry will now be discussed in reference to the switching circuitry previously described and shown in FIG. 3D. However, it should be recognized that a thermostat control would not be necessary if the circuit described is not used in connection with a compressor motor or other motor load which involves temperature control.

The motor load and thermostat 210 are connected in series with power lines X and Y shown in connection with the AC converter circuitry shown in FIG. 3D. The thermostat 210 provides a closed circuit or conductive path through the motor induction load when the temperature sensed by the thermostat rises above a predetermined value indicating the compressor motor should be on. A thermostat provides an open or non-conductive path when the temperature sensed by the thermostat falls below a predetermined value. The FET Q12 is interconnected with the transistor pair Q6 and Q7, shown in FIG. 3C. This transistor pair, in conjunction with resistors R65 and R83, provides a substantially constant current source. In the embodiment shown, this current source provides a current of approximately 13 milliamps.

AC converter disablement turns transistors Q12 through Q15 off. The current sources (transistors Q6 and Q8) are turned on. A higher voltage is provided to the negative input of comparator U2A, above the reference voltage provided to the positive input of comparator U2A. In the circuit shown, the negative input (while the thermostat is open) is approximately 2.5 Volts and the reference voltage is 2 Volts. This results in maintenance of a low output from comparator U2A which is supplied to the positive input of comparator U2B, which as previously described will result in deactivation of the boost converter circuit.

When the thermostat provides a closed or conductive path through the motor load, the current source Q8 is connected in parallel with current source Q6 through the low-resistance (DC path) motor run winding. The U2A output voltage, and is switches high due to a lower negative input voltage, and is effectively latched by diode D36. When the converter starts, U2A ignores the square wave provided at its negative input because the input is clamped by diode D29, below the reference voltage. U2A therefore detects only the closing, not the reopening of the thermostat. U2A is reset when latch U4B is set.

The constant current is provided by transistors Q8 and Q9 and resistors R66 and R88, shown in FIG. 3C. This current source, like the Q6/Q7 current source, maintains a level of approximately 13 milliamps in the circuit shown.

The closed path through the thermostat and motor load results in connecting the two current sources in parallel to a negative input of comparator U2A through resistor R87. The voltage provided to the negative input of comparator U2A declines to a voltage below the reference voltage, in the circuit shown approximately 1.5 volts. This causes comparator U2A to switch to a high output, which as described previously with respect to comparator U2B and latch U4B, will result in activation of the converter and other circuitry and turn the motor back on.

Connection of the thermostat in series with the motor load provides certain advantages. While the thermostat provides a non-conductive path, and the motor is off, the motor load is effectively disconnected from the circuitry. Connecting the thermostat in series with the load and the AC converter circuitry eliminates the need for additional elements devoted to thermostat sensing and motor control.

An alternative embodiment of a circuit in accordance with the present invention provides solely for a DC power source, without capability of transferring to an AC power source when available. Such a nontransfer circuit may be implemented substantially as described above, with minor modifications. Many of these changes are indicated by elements which would be omitted from the transfer circuit, primarily among the elements shown in FIG. 3D. The omitted elements include the elements of the start winding control circuit 70, AC input leads 110, relay 120 as shown in FIG. 1.

Figure 4A:
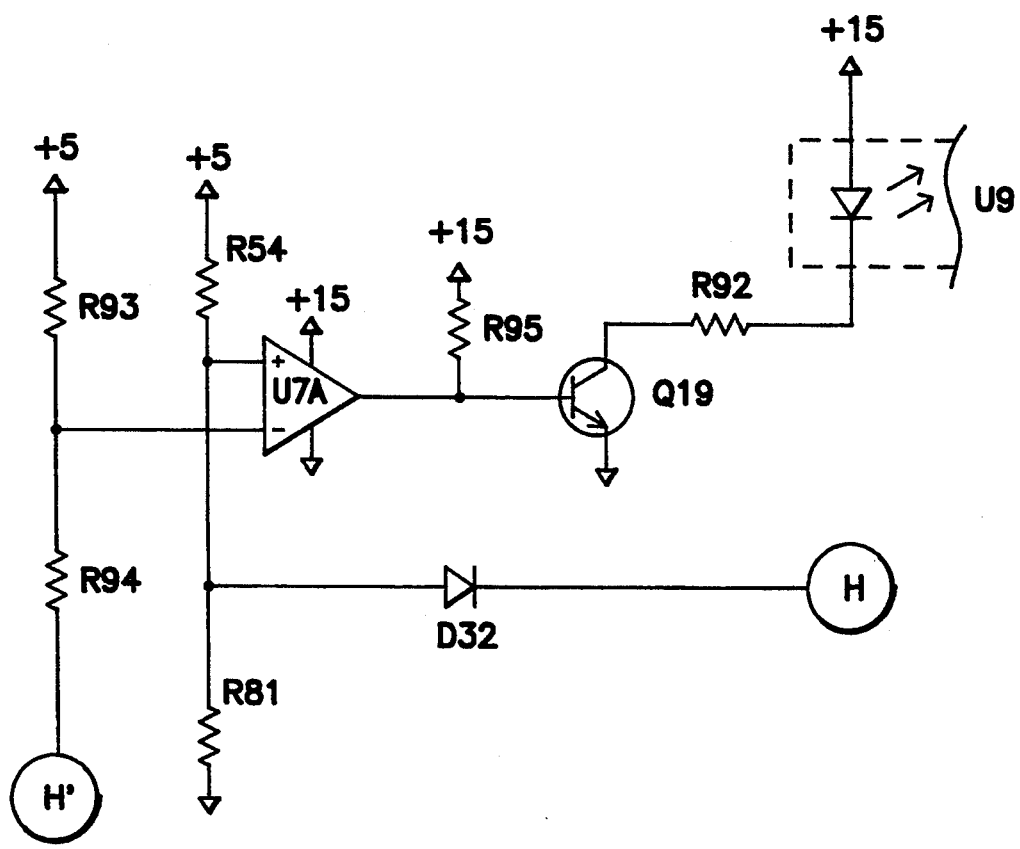
FIGS. 4A and 4B are schematic circuit diagrams of an alternative embodiment of a motor starting and control circuit in accordance with the invention.
Figure 4B:
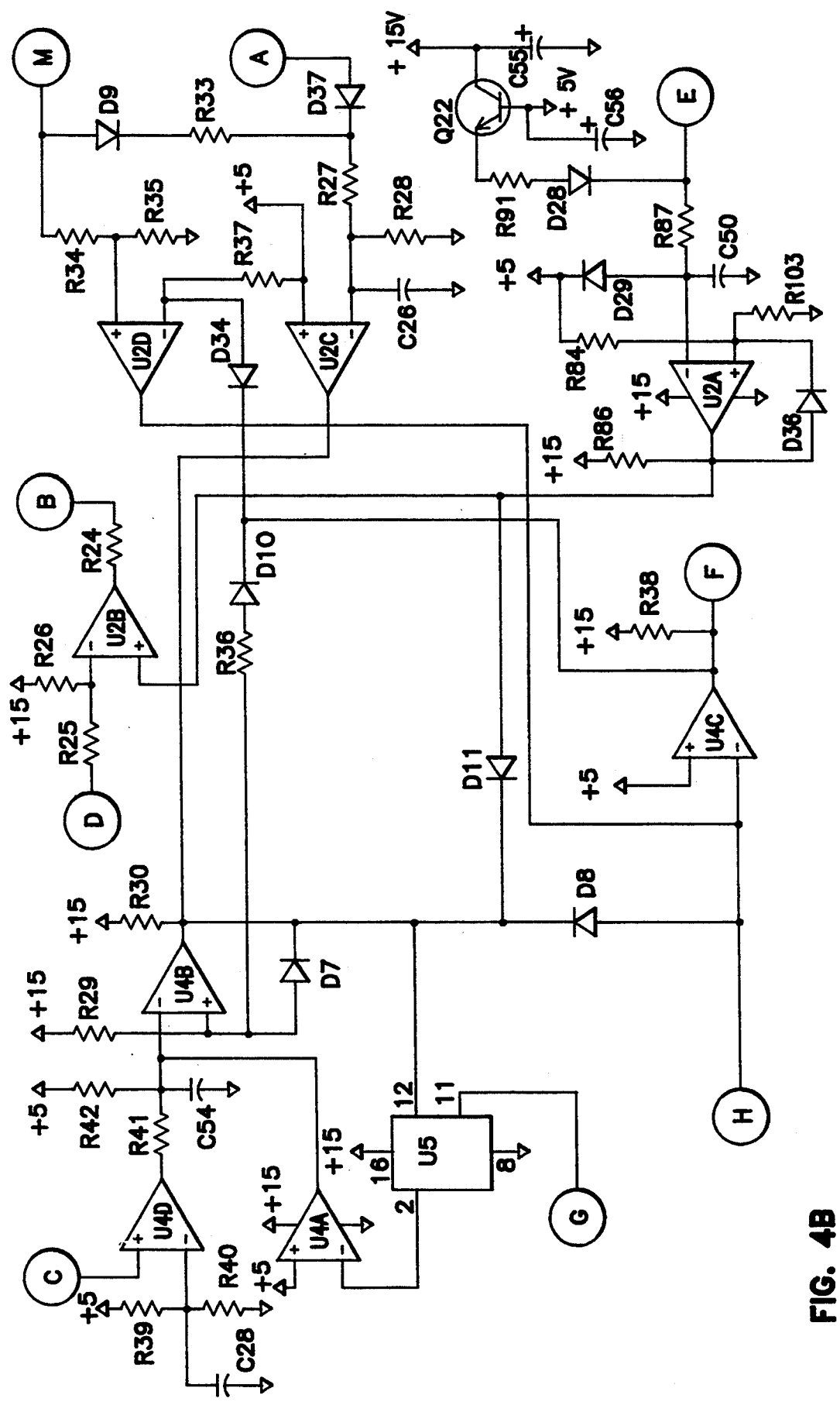

The modifications to the circuitry surrounding comparator U7A, shown in FIG. 3B in the AC/DC transfer circuitry, is shown for a nontransfer circuit in FIGS. 4A and 4B. FIG. 4A shows the positive input to comparator U7A connected to resistors R54 and R81. However, the circuit for comparator U7A is modified so that U7A provides the control signal for the triac opto-coupler U9 controlling the start winding.

Thus, the negative input to U7A is connected through a voltage divider comprised of R93 and R94 via H' to the output of the ramp generator U6B. When the ramp increases to about 1.4 volts, U7A's output switches to low, turning off Q19 and hence the opto-coupler U9, thereby disconnecting the start winding before the motor speed has subsequently increased. D32 is provided to disable U9 when the converter 40 is disabled to reduce the idling current draw from source 20.

The above description and accompanying drawings will readily indicate to one skilled in the art the functions and advantages of the present invention. While the invention has been described in conjunction with a particular preferred embodiment thereof, illustrated in the accompanying drawings, as directed to a particular application, variations and equivalents to various aspects of the invention may be provided without departing from the spirit and scope of the invention. For example, the circuit as described herein may be adapted for use in a non-single-phase circuit, such as in a three-phase system.

Table of Values

Capacitors

| Capacitor No. | Capacitance (Microfarads, unless otherwise noted |
| --- | --- |
| C1, C4, C29, C35, C37, C43, C45, C47, C49, C8, C62 | 0.001 |
| C2, C5, C7, C15, C19, C34, C36, C42, C44, C46, C48, C50, C53, C54 | 0.01 |
| C3, C17, C18, C26, C28, C31, C63 | 0.1 |
| C6, C9 | 1.0 |
| C10, C11 | 1000 |
| C13 | 1500 |
| C16 | .047 |
| C20 | 220 |
| C21 | 4700 pF |
| C22, C30, C32, C39, C52 | 0.22 |
| C23, C25, C33, C60, C61 | 10 |
| C24 | 33 |
| C38 | 4.7 |
| C40, C55 | 22 |
| C51 | .47 |
| C56 | 2.2 |

| Resistor/Resistors No. | Resistance (Ohms) |
| --- | --- |
| R2 | 221K |
| R3 | 3.01K |
| R4 | 51K |
| R5, R55, R57, R59, R67, R68, R74, R77, R93 | 100K |
| R8, R15, R31, R40, R52, R102, R105, R106 | 1K |
| R9, R10, R12 | 10 |
| R11 | .003 |
| R13 | 11K |
| R14 | 3.3M |
| R16, R44 | 47K |
| R17 | 11.5K |
| R18, R28, R29, R30, R32, R37, R38, R41, R42, R54, R56, R62, R64, R76, R81, R86, R100, R101 | 10.0K |
| R19, R47, R97 | 1M |
| R20 | 330K |
| R21 | 12.1K |
| R22 | 90.9K |
| R23, R71, R72 | 1.5K |
| R24, R92 | 470 |
| R25, R26, R85 | 2.2K |
| R27 | 24.9K |
| R33 | 294K |
| R34 | 287K |
| R35 | 9.76K |
| R36 | 2K |
| R39, R58, R103 | 47.5K |
| R43 | 2M |
| R45, R49, R53, R61, R69, R70 | 4.7K |
| R46 | 1.8K |
| R48 | 220 |
| R50 | 536K |
| R51 | 1.69M |
| R60 | 41.2K |
| R63, R6, R7 | 2.21K |
| R65, R66, R75, R104 | 33K |
| R73 | 56K |
| R78 | 3.9K |
| R79, R82, R83, R88 | 47 |
| R80 | 820 |
| R84 | 75K |
| R87 | 220K |
| R90 | 6.8K |
| R91 | 110 |
| R94 | 43K |
| R95 | 15K |
| R96 | 84.5K |

| Diodes | No. |
| --- | --- |
| D1 | MR750 |
| D2 | MUR440 |
| D3, D6, D7, D8, D9, D10, D11, D12, D15, D29, D32, D34, D35, D36, D37, D41 | 1N4148 |
| D4, D13, D14, D16, D17, D18, D19, D20, D21, D22, D23, D24, D28, D30, D33, D38, D39, D40 | 1N4004 |
| D5 | UF4002 |

| Transistors | No. |
| --- | --- |
| Q1, Q2 | IRFZ42 |
| Q3 | TIP 29 |
| Q4, Q5, Q18, Q21 | 2N3906 |
| Q6, Q8 | MPSA42 |
| Q7, Q9, Q16, Q19, Q20, Q22 | 2N3904 |
| Q10, Q11 | 2N7000 |
| Q12, Q13, Q14, Q15 | IRF640 |
| Q17 | MCR100-6 |

| Inductors | |
| --- | --- |
| L1 | 20 uH |

| Other Circuit Elements | |
| --- | --- |
| D26, D27 | 2N6397 |
| U1 | 3524B (regulator) |
| U2, U4, U6, U7 | LM339 quad comparators |
| U3 | 4013B Dual D flip-flop |
| U5 | 4060B (counter) |
| U8 | 4N37 |
| U9 | TIL3021 (triac opto-coupler) |
| Z1, Z4 | 1N5246B (zener) |
| Z2, Z3, Z6 | 1N5248B (zener) |
| Z5 | 1N5231B (zener) |

What is claimed is:
1. A circuit for providing AC power to an induction motor from a DC source, comprising:
   pulse width control means for generating a constant pulse width control signal;
   voltage control means for generating a constant peak voltage control signal;
   frequency control means for generating a variable frequency control signal;
   output means, responsive to the constant pulse width control signal, the constant peak voltage control signal and the frequency control signal, for providing an AC power signal having a substantially constant peak voltage, positive and negative pulses having substantially constant pulse widths, and a varying frequency comprised of a first, lower fre- quency, a second linearly increasing frequency and a third, higher frequency to the induction motor such that the AC power signal applied to the induction motor has a constant volts per hertz ratio.

2. A circuit in accordance with claim 1 wherein the induction motor is a single-phase motor.

3. A circuit for controlling the power provided to an induction load by a converter comprising:
   (a) ramping voltage generating circuit means for generating a voltage output signal which provides a first voltage signal for a first selected time period, a linear ramping voltage signal which changes from a first voltage level to a second voltage level at a substantially constant rate over a second selected time period, and the second voltage signal;
   (b) voltage-controlled oscillating circuit means connected to and substantially controlled by the ramping voltage generating circuit means for generating a pulse signal having a first, lower frequency substantially corresponding to the first voltage signal generated by the ramping voltage generating circuit means for a time corresponding to the first selected period of time, a linearly increasing frequency which increases from the first, lower frequency to a second higher frequency at a rate substantially proportionate to the rate at which the ramping voltage generating circuit means voltage output signal changes from the first voltage signal to the second voltage signal, and a second, higher frequency substantially corresponding to the second, voltage signal generated by the ramping voltage generating circuit means; and
   (c) constant-pulse-width circuit means connected to the voltage-controlled oscillating circuit means output for generating a control signal to a circuit providing AC power to the induction load such that the waveform provided across the induction load by the circuit providing the AC power has a substantially constant pulse-width, a frequency substantially proportionate to the frequency of the signal generated by the voltage-controlled oscillating circuit means and a substantially constant peak voltage.

4. A circuit in accordance with claim 3 wherein the first voltage level generated by the ramping voltage generating circuit means is at a lower level than the third voltage level generated by the ramping voltage generating circuit means.

5. A circuit in accordance with claim 3 further comprising a delay means connected to the input of the voltage-controlled oscillating circuit means for delaying an increase in the frequency of the pulse signal generated by the voltage-controlled oscillating circuit means for a predetermined period of time.

6. A circuit in accordance with claim 3 further comprising start winding activation circuit means receiving the AC power controlled by the constant-pulse-width circuit means for activating a start winding for an induction motor for a substantially constant, predetermined period.

7. A circuit in accordance with claim 3 wherein the induction motor is a single-phase motor.

8. A circuit in accordance with claim 3 wherein the induction motor is a three-phase motor.

9. A circuit for powering a single phase induction motor with a DC source comprising:
   (a) an AC converter circuit means for receiving DC power and periodically providing AC power across an induction motor load, said AC converter circuit means including means for switching the connection of the DC power across the induction load to provide a first positive voltage across the induction load, a second substantially null voltage across the induction load, a third negative voltage across the induction load, and a fourth substantially null voltage across both ends of the inductive load, wherein the first positive voltage provided across the induction load and third negative voltage provided across the induction load by the AC converter circuit means are provided for substantially constant time period, and wherein frequency with which the first positive voltage, second substantially null voltage, third negative voltage and fourth null voltage are provided across the induction load varies; and
   (b) AC converter circuit control means for providing a periodic control signal to said AC converter circuit means for switching said AC converter circuit means to alternatively provide the first positive voltage, first null voltage, the first negative voltage, and second null voltage across said induction load.

10. A circuit in accordance with claim 9 wherein said AC converter circuit control means provides a control signal to said AC converter circuit means such that one of said null voltage signals is provided by connecting a conductive path to both ends of the induction motor load from one end of the DC power source, and the other of said null voltage signals is provided by providing a conductive path to both ends of the induction load to the other end of the DC power source.

11. A circuit in accordance with claim 9 wherein the AC converter circuit means comprises a first transistor connected between a first end of the DC power source and a first end of the induction motor load, a second transistor connected between the first end of the DC power source and a second end of the induction motor load, a third transistor connected between a second end of the DC power source and the first end of the induction motor load, and a fourth transistor connected between the second end of the DC power source and the second end of the induction motor load.

12. A circuit in accordance with claim 11 wherein the converter circuit control means comprises a dual D flip-flop controlled by first and second clock signals, wherein the first clock signal is inverted to produce the second clock signal.

13. A control circuit for controlling the activation of an induction motor comprising:
   (a) a thermostat, connected to monitor an external temperature, and connected in series between a first end of the induction motor and a power source for providing a closed circuit connection between the induction motor and the power source when the temperature detected by the thermostat is within a preselected range and an open circuit between the induction motor and the power source when the temperature detected by the thermostat is within a preselected range and an open circuit between the induction motor and the power source when the temperature detected by the thermostat is within a second range;
   (b) first voltage generating circuit means connected to the thermostat and induction motor for generating a first voltage signal when the thermostat provides a closed circuit connection;

(c) a second voltage generating circuit means connected to the thermostat for providing a second voltage signal when the thermostat provides an open circuit connection; and (d) voltage comparator means, connected to receive the first and second voltage signals, for generating a first control signal when the first voltage signal is received and a second control signal when the second voltage is received;

(e) control means, connected to said voltage comparator means, for activating the induction motor power source upon receipt of the first voltage signal.

14. A control circuit in accordance with claim 13 wherein said first and second voltage generating circuit means comprise current sources.

15. A circuit for controlling an induction load powered by a DC source comprising:

(a) a converter circuit means for receiving DC power and providing AC power to the induction load, said converter circuit means including means for switching the connection of the DC power across the induction load to provide a first positive voltage signal across the induction load, second substantially null voltage across the induction load a third negative voltage across the induction load, and a fourth substantially null voltage across both ends of the induction load, said second and fourth substantially null voltages provided by providing a conductive path between one of the two wires providing the DC power and both ends of the induction load;

(b) converter circuit control means for providing a periodic control signal to said converter circuit means for switching said converter circuit means to alternately provide a positive voltage, first null voltage, negative voltage, and second null voltage across said induction load; and (c) start winding activation circuit means for the single phase induction load comprising:

(i) ramp voltage generating circuit means for generating a voltage output signal which provides a first voltage signal for a first selected time period, a ramping voltage signal which increases at a constant rate from the first, voltage signal to a second, higher voltage signal over a second selected time period;

(ii) voltage-controlled oscillating circuit means connected to and substantially controlled by the ramp generating circuit means for generating a pulse signal at a first, lower frequency substantially corresponding to the first, lower voltage signal generated by the ramp voltage generating circuit means, an increasing frequency which increases from the first, lower frequency to a second, higher frequency at a rate substantially proportionate to the rate at which the ramp voltage generating circuit means output voltage changes from the first voltage signal to the second voltage signal, and a second, higher frequency substantially corresponding to the second, higher voltage signal generated by the ramp voltage generating circuit means; and (iii) constant-pulse-width circuit means connected to the voltage-controlled oscillating circuit means output for generating a control signal to the converter circuit means such that the signal provided across the induction load by the converter circuit means has a substantially constant pulse-width, a frequency substantially proportionate to the frequency of the signal generated by the voltage controlled oscillating circuit means and a substantially constant peak voltage.

16. A circuit in accordance with claim 15 wherein the induction motor is a single-phase motor.

17. A circuit in accordance with claim 15 wherein the induction motor is a three-phase motor.

18. A control circuit in accordance with claim 15 further comprising a circuit for activating the start winding of the single phase induction motor comprising rectified voltage generating means for generating a rectified voltage signal from an AC or inverted DC power source, constant voltage generating means connected in parallel across said rectified voltage generating means for converting the rectified voltage signal providing a substantially constant voltage signal, and activating circuit means interconnected with the constant voltage generating means for providing a starter winding circuit activation signal for a selected period of time substantially independent of the level of the substantially constant voltage signal generated by constant voltage generating means.

19. A temperature control circuit for an induction motor load power circuit comprising:

(a) a thermostat means, connected to monitor an external temperature, and connected in series with the induction motor load and a power supply and having first, open and second, closed, states corresponding to off and on settings;

(b) a first and second current source means electrically interconnected with said thermostat means such that the current source means are connected in parallel when said thermostat means in one of the first and second states;

(c) a comparator means having an input interconnected to said first and second current source means, such that a first voltage is detected by the comparator means when said thermostat means is in one of the first and second states and a second voltage is detected by the comparator when said thermostat means is in the other of the first and second states;

(d) control means interconnected to the output of said comparator means for activating the induction motor load power circuit when the first voltage is detected by the comparator; and (e) control means for sensing the rising DC bus voltage which is indicative of loss of induction motor load on DC converter due to the opening of the thermostat.

20. A method for starting an induction motor having a start winding, comprising the steps of:

(a) controlling the pulse-width of an AC signal provided to the induction motor to maintain a substantially constant pulse-width;

(b) controlling the amplitude of the AC signal provided to the induction motor to maintain a substantially constant peak amplitude;

(c) providing the controlled AC signal to the induction motor at a first, lower frequency for a predetermined period of time;

(d) activating the start winding of the induction motor during the predetermined period of time, wherein activating step (d) occurs substantially simultaneously with providing step (c);

(e) linearly ramping the frequency of the controlled AC signal such that the frequency of the controlled AC signal being applied to the induction motor increases linearly from the first, lower frequency to a second, higher frequency, wherein linearly ramping step (e) occurs after the predetermined period of time of steps (c) and (d); and (f) providing the controlled AC signal to the induction motor at the second, higher frequency.

21. The method according to claim 20 wherein activating step (d) further includes the steps of:
(d1) generating a rectified voltage signal from an AC source;
(d2) converting the rectified voltage signal into a substantially constant voltage signal;
(d3) applying a start winding activation signal to the start winding for the predetermined period of time, wherein the predetermined period of time is sufficient to start the induction motor but not substantially longer.

* * * * *

UNITED STATES PATENT AND TRADEMARK OFFICE
CERTIFICATE OF CORRECTION

PATENT NO. : 5,350,992      Page 1 of 2
DATED : September 27, 1994
INVENTOR(S) : Jeffrey B. Colter It is certified that error appears in the above-indentified patent and that said Letters Patent is hereby corrected as shown below:

Col. 5, line 12, insert --(U1)--after the letters "IC".

Col. 7, line 28, insert --current-- after the word "excess".

Col. 7, line 68, insert --of the-- after the word "activation".

Col. 9, line 17, insert --H-- after the word "an".

Col. 10, line 57, "D2" should read --D21--.

Col. 10, line 61, insert --of-- after the word "level".

Col. 11, line 7, "provide" should read --provided--.

Col. 11, line 15, "Q15" should read --Q16--.

Col. 11, line 22, "deactivate" should read --deactivated--.

Col. 16, line 13, claim 9, "period" should read --periods--.

UNITED STATES PATENT AND TRADEMARK OFFICE
CERTIFICATE OF CORRECTION

PATENT NO. : 5,350,992
DATED : September 27, 1994
INVENTOR(S) : Jeffrey B. Colter It is certified that error appears in the above-indentified patent and that said Letters Patent is hereby corrected as shown below:

Col. 16, lines 31-32, claim 10 "providing" should read --connecting--.

Signed and Sealed this

Eleventh Day of April, 1995

*Attest:*

BRUCE LEHMAN

*Attesting Officer*   *Commissioner of Patents and Trademarks*